March 18, 1969    H. HAHN ET AL    3,434,061
COMPENSATION OF PHASE DRIFT ON LONG CABLES
Filed Sept. 19, 1966
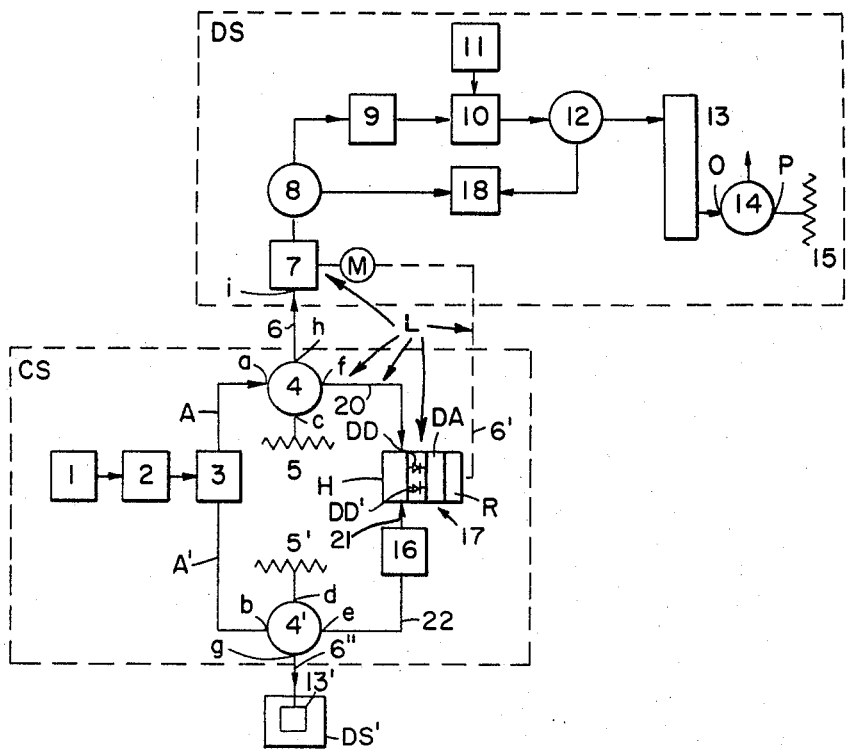
INVENTOR.
HARALD HAHN
BY  HENRY J. HALAMA United States Patent Office 3,434,061
Patented Mar. 18, 1969

3,434,061
COMPENSATION OF PHASE DRIFT ON LONG CABLES
Harald Hahn, East Patchogue, and Henry J. Halama, Shoreham, N.Y., assignors to the United States of America as represented by the United States Atomic Energy Commission
Filed Sept. 19, 1966, Ser. No. 580,513
U.S. Cl. 328—155      5 Claims
Int. Cl. H03k 5/18

ABSTRACT OF THE DISCLOSURE

A method and apparatus for compensating for phase drift on long cables, comprising utilizing a reflected signal in said cable to measure and compensate for phase difference independent of changes in the cable characteristics. The system of this invention is praticularly adapted for use with a radio-frequency beam separator having RF deflectors for separating the desired particles from a charged particle beam.

---

This invention was made in the course of, or under a contract with the United States Atomic Energy Commission.

Prior art

Precise and stable control of phase drift in long cables is required in many types of circuits. This control is particularly important in radio-frequency beam separators for high energy charged particles apparatus, such as RF beam separators for the Brookhaven National Laboratory Alternating Gradient Synchrotron and 80" bubble chamber. The principles of these separators are described in W. Schnell Report CERN 61–5, Accelerator Research Div., 1961, CERN, Geneva, where the use of radio-frequency signals is described for appropriately providing the desired separation of the many different particles that are produced with accelerators. Generally, the cable phase drift, which is caused by temperature and humidity changes, has been difficult or expensive to control because the cable has connected the RF separator located in a high radiation area with the control center, which is in an area safe from radiation a long distance from the RF separator. Heretofore, large, costly and complicated temperature and humidity cable ambient environment controls were required.

It is thus an object of this invention to provide a simple, economical and effective system for compensating for phase shift in long cables independent of the cable characteristics produced by changes in its ambient environment.

It is also an object of this invention to provide for varying the phase difference in RF separator charged particle deflectors for initial set-up and tuning.

Description of the invention

In accordance with this invention, the radio-frequency signal transmitted along a cable produces a reflected signal from one end of the cable to the other end and is utilized to measure and compensate for phase differences independently of changes in the cable characteristics. More particularly, in one embodiment, this invention comprises a cable system for transmitting first and reflected signals from a first end of said cable back to the opposite end, first and second four-port circulators having a first port coupled to said opposite end, a second terminated port, a third port coupled to said cable, and a fourth port including a phase meter with a bridge hybrid coupled thereto through a variable reference phase shifter, said phase meter with the bridge hybrid having a sum and difference port terminated by diode detectors whereby an output phase error signal is produced from the reflected signal in said cable that is a function of phase drift in said cable. With the proper selection and arrangement of components as described in more detail hereinafter, the desired phase drift compensation is provided.

The above and further objects and novel features of the invention will appear more fully from the following detailed description when the same is read in connection with the accompanying drawing. It is expressly understood, however, that the drawing is not intended as a definition of the invention but is for the purpose of illustration only.

Referring to the drawing a partial schematic illustration of the system of this invention is shown in conjunction with the details of an RF beam separator in block diagram form. The central control station trailer CS is at one location while the RF beam deflector station DS in at another location. Also, the deflector station DS' is at still another location. Due to the distance between the deflector and control stations they are connected by long semi-flexible cables, which are phase compensated in accordance with this invention.

The control station CS has a phase locked source 1 embodying a reflex klystron. The output therefrom passes through a TWT amplifier 2 and a power splitter 3, comprising a 3 db hybrid. This splitter 3 feeds two respective input ports $a$ and $b$ of two four-port circulators 4 and 4'. Coaxial terminations 5 and 5' connect with output ports $c$ and $d$ of circulators 4 and 4' and output ports $e$ and $f$ respectively connect with refernce phase shifter 16 and phase meter 17, comprising a 3 db hybrid H, two diode detectors DD and DD', differential amplifier DA and a polarized relay R. The phase shifter 16 connects with the phase meter 17 through line 21 and with port $e$ through line 22. Line 21 connects phase meter 17 through hybrid H and line 20 connects port $f$ of circulator 4 with phase meter 17. Servo loop L, comprises line stretcher 7, circulator 4, line 20, phase meter 17 and line 6'. The output port $g$ of circulator 4' connects with iris-loaded waveguide deflector 13' at one deflector station DS' through cable 6" from central control station CS and the output port $h$ of circulator 4 connects with iris-loaded waveguide deflector 13 at deflector station DS through cable 6 from control station CS. The deflector station systems for cables 6" and 6, i.e. deflector stations DS and DS' are alike, except that deflector station DS' has no line stretcher or servo loop, as will be understood in more detail hereinafter. For ease of explanation the deflector station DS will be described.

The deflector station DS has a motor M for adjusting the length of line stretcher 7 connected to a directional coupler 8. This coupler 8 connects in series with plate pulsed triode amplifier 9 and high power klystron 10, which has a 65 mw. line modulator 11 using hydrogen thyratrons. The klystron 10 connects with dual direction coupler 12, which has a pulsed phase meter 18 connected between the coupler 12 and directional coupler 8. The coupler also connects with iris-loaded waveguide deflector 13 having an output connection to input port $o$ of dual directional coupler 14. Output $p$ of this coupler 14 connects with dry load 15.

The control station CS connects with deflector station DS by means of co-axial cable 6 between port $h$ of circulator 4 and input $i$ of line stretcher 7. Phase meter 17 also connects with line stretcher 7 through cable 6'.

In operation the primary microwave frequency source 1 is a phase-locked oscillator using a reflex klystron. The frequency thereof is determined by a reference crystal whose output is first quadrupled in a varactor multiplier and then multiplied by 32 using a step recovery diode. This signal is mixed with that of the reflex klystron. The resulting beat frequency is fed to a phase bridge, where it is compared in phase to a variable I.F. frequency of about 30 mHz. The output of the phase bridge is a DC voltage proportional to the phase difference between the two above-mentioned signals and it is used to control a repeller voltage and thus the frequency of the reflex klystron. The phase-locked source can deliver 100 mw. of power in the range from 2848 to 2864 mHz. with a frequency stability of better than $10^{-6}$. Since both frequencies are determined by quartz crystals, there are negligible side bands and very low spurious phase modulations. However, the phase difference between the deflectors in the RF separator must be kept constant at a chosen value for high purification of the beams. On the other hand, the phase difference must be variable for the tuning procedure or initial setup.

To minimize the drift of the phase difference between deflector stations DS and DS' due to unequal temperature or other ambient changes on the RF cable 6 or 6" connecting the central control station CS with the deflector stations DS and DS' respectively, the cables 6 and 6" are advantageously semi-flexible cables with a temperature coefficient of $10^{-5}/°$ C. and an attenuation of 2.5 db/100' at 3 gHz. The phase compensation is provided by the described elements operating as a phase servo loop L utilizing the reflected signals coming back on the cable 6 and 6" from deflector stations DS and DS'.

To this end, four port circulators 4 and 4' are inserted between the output arms A and A' of the power splitter 3 and the cable 6 and 6" transmitting the RF power to the pulsed triode amplifier 9 and the corresponding element in DS'. Since amplifier 9 and the corresponding amplifier in DS' are pulsed only once every two or three seconds for 10 μs., the input looks the rest of the time like an open circuit (measured VSWR≈ 4) and the power is reflected back along the cables 6 and 6". The reflected signals from both branches of the power splitter 3 are directed through the four-port circulators 4 and 4' to the precisely balanced 3 db hybrid H of phase meter 17 to provide the phase error signal. The motor-driven variable line stretcher 7 preceding the upstream triode amplifier 9 permits the adjustment of the phase difference between the RF separator deflectors, if necessary.

The sum and difference port of the phase bridge hybrid H of phase meter 17 are terminated by diode detectors DD and DD' and their outputs are fed into the differential amplifier DA of the adjustable gain in the phase meter 17. The DA amplifier output is a function of the phase difference of the RF signals into the hybrid H of phase meter 17. It is proportional to phase difference if the RF signals are close to quadrature at the inputs to the hybrids H in phase meter 17, and the phase sensitivity is then greatest. The reference phase shifter 16, preceding one input of the hybrid H of phase meter 17 serves to establish the condition. In actual tests, it has been established that the phase error signal in phase meter 17 measures the relative phase difference (phase changes) directly between the ends of cable 6 and 6", independently of the length thereof. Consequently, the phase measurement of the phase error signal in phase meter 17 is independent of the cable temperatures or other variable ambient conditions.

The accuracy of this phase measurement in phase meter 17 depends on a high directivity of the four-port circulators 4 and 4', low insertion loss of the cables therefor and absence of spurious reflections. It is therefore advantageous to select a motor-driven line stretcher 7 with VSWR<1.1 for phase shifting and place it at the far or upstream end of cable 6 where it enters the input $i$ of the line stretcher 7. Advantageously, also, suitable connectors, having a low VSWR are used between the circulators 4 and 4' and the triode amplifier 9. One advantageous connector is the Decifix–B connector.

To obtain the feedback signal in servo loop L, which comprises stretcher 7, line 6, circulator 4, line 20, phase meter 17 and line 6', the phase error signal in phase meter 17 actuates the polarization relay R, advantageously with snap action, in phase meter 17 if the phase difference between the ends of cable 6 exceeds a certain value. This relay then determines in which direction the motor, mechanically coupled to the adjustable phase shifter 7, will turn. Thus, the feed back loop formed by cable 6' and phase shifter 7 in loop L, acts to provide a null seeking servo with gain adjustment determining the phase sensitivity. The required phase difference between cable ends of cables 6 and 6" is, therefore, obtained by the setting of the reference phase shifter 16.

It has been shown that the phase difference between the ends of cable 6 and 6" equals one half the phase change of the reference phase shifter 16. Also, the dead band of the servo loop is less than 1° and the system is unconditionally stable. The tracking error between the cables is ≤±4°. Advantageously, the motor-driven phase shifter 7 mechanically couples to a potentiometer for remote position monitoring of the phase shifter 7.

This invention has the advantage of providing simple, effective, stable and accurate compensation of phase shift in long cables. The method and apparatus of this invention moreover, in actual tests have been successfully operated with two deflectors of an RF beam separator with different temperature and humidity conditions with phase differences of 1° RMS or less. Additionally, the phase drift compensation of this invention is independent of cable characteristics while still making provision for varying the phase difference in the RF separator deflectors for initial set-up and tuning.

What is claimed is:

1. Apparatus for transmitting radio frequency signals from a control station (CS) having a constant radio frequency signal source (1) to two remotely located charged particle deflector stations (DS and DS') through long flexible cables (6 and 6") interposed therebetween whereby the phase relationship of said radio frequency signals received at said two deflector stations has a desired constant phase difference relationship, comprising:

(a) means (8, 9, 10, 11, 12, 13, 14, 15 and 18) in said deflector stations for utilizing said radio frequency signals in said deflector stations for charged particle deflections and rapidly alternately reflecting said radio frequency signals from said deflector stations to said control station;

(b) means (17) in said control station for comparing said radio frequency signals reflected to said control station for producing an error signal corresponding to the phase difference relationship between said signals reflected to said control station;

(c) motorized cable stretching means (7) responsive to said error signal for stretching at least one of said cables (6) for causing said error signal to be varied for causing said radio frequency signals reflected to said control station to have a desired constant phase difference relationship; and (d) means (16) in said control station for establishing the condition of phase quadrature in said compared radio frequency signals whereby the desired constant phase difference relationship between said radio frequency signals utilized in said deflector stations is produced.

2. The invention of claim 1 in which said cables (6 and 6") are located in an ambient subject to temperature and humidity changes and comprise long lengths of semi-flexible cable connected to deflector stations (DS and DS"_ for high energy charged particle apparatus located in areas of high radiation levels long distances from said control station (CS) whereby said means (7) for stretching said one of said cables (6) controls the phase difference of said radio frequency signals transmitted by said cables (6 and 6") for utilization in said deflector stations to be constant even though the temperature and humidity changes of said ambient around said cables (6 and 6") causes phase drift in said cables (6 and 6").

3. The invention of claim 1 in which said control station (CS) has circulators (4 and 4') formed with input ports (*a* and *b*) connected respectively to said signal source (1) by a power splitter (3), output ports (*g* and *h*) connected respectively to the ends of said cables (6 and 6") in said control stations for transmitting said radio frequency signals from said control station (CS) over said long cables (6 and 6") to said deflector stations (DS and DS'), output ports (*c* and *d*) forming coaxial terminations (5 and 5'), an output port (*f*) connected to said means (17) for comparing said radio frequency signals reflected from said deflector stations to said control station, and an output port (*e*) connected through said means (16) for establishing said condition of phase quadrature to said means (17) for comparing said radio frequency signals reflected from said deflector stations to said control station whereby said error signal and desired constant phase difference relationships are produced.

4. The invention of claim 3 in which said means (17) for comparing said reflected radio frequency signals, comprises a hybrid bridge (H) connected to respective of said output ports (*e* and *f*) to form a phase meter, and has terminal diode detectors (DD and DD') including a differential amplifier (DA) of adjustable gain for producing said error signal for actuating said motorized cable stretching means (7) to produce said desired constant phase difference relationships.

5. The invention of claim 1 in which said motorized cable stretching means (7) responsive to said error signal, comprises a variable cable stretcher having a polarized relay (R) responsive to said error signal, and a motor (M) responsive to said polarized relay for variably adjustably stretching said one of said cables (6) in a direction necessary to produce a desired constant phase difference between said radio frequency signals utilized in said deflector stations while still permitting the selective initial variation of said desired phase difference relationships.

References Cited

UNITED STATES PATENTS

| | | | |
|---|---|---|---|
| 3,013,224 | 12/1961 | King | 333—18 |
| 3,021,490 | 2/1962 | Kompfner | 333—2 XR |
| 3,138,800 | 6/1964 | Speller | 324—84 XR |
| 3,281,710 | 10/1966 | Hoover et al. | 333—11 XR |

HERMAN KARL SAALBACH, *Primary Examiner.*

M. NUSSBAUM, *Assistant Examiner.*

U.S. Cl. X.R.

333—18; 328—235